(12) United States Patent
Cheng et al.

(10) Patent No.: US 9,335,826 B2
(45) Date of Patent: May 10, 2016

(54) METHOD OF FUSING MULTIPLE INFORMATION SOURCES IN IMAGE-BASED GESTURE RECOGNITION SYSTEM

(71) Applicant: Robert Bosch GmbH, Stuttgart (DE)

(72) Inventors: You-Chi Cheng, Atlanta, GA (US); Chin-Hui Lee, Atlanta, GA (US); Zhe Feng, Palo Alto, CA (US); Fuliang Weng, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 13/781,340

(22) Filed: Feb. 28, 2013

(65) Prior Publication Data

US 2014/0089864 A1    Mar. 27, 2014

Related U.S. Application Data

(60) Provisional application No. 61/605,152, filed on Feb. 29, 2012.

(51) Int. Cl.
| | |
|---|---|
| *G06F 3/01* | (2006.01) |
| *G06F 3/023* | (2006.01) |
| *G06F 3/042* | (2006.01) |
| *G06F 3/0488* | (2013.01) |

(52) U.S. Cl.
CPC .............. *G06F 3/017* (2013.01); *G06F 3/0233* (2013.01); *G06F 3/0425* (2013.01); *G06F 3/04883* (2013.01)

(58) Field of Classification Search
USPC ........................................................ 715/863
See application file for complete search history.

(56) References Cited

U.S. PATENT DOCUMENTS

| | | | |
|---|---|---|---|
| 6,052,481 A | 4/2000 | Grajski et al. | |
| 7,274,800 B2 * | 9/2007 | Nefian ............... | G06K 9/00335 348/169 |

(Continued)

FOREIGN PATENT DOCUMENTS

| | | |
|---|---|---|
| EP | 0539749 A2 | 5/1993 |
| WO | 2012061256 A1 | 5/2012 |

(Continued)

OTHER PUBLICATIONS

"Combining Gaussian Mixture Models and Support Vector Machines for Relevance Feedback in Content Based Image Retrieval" Marakakis et al. published on the Artificial Intelligence Applications and Innovations III IFIP International Federation for Information Processing vol. 296, 2009, pp. 249-258.*

*Primary Examiner* — Jason Olson
*Assistant Examiner* — Deeprose Subedi
(74) *Attorney, Agent, or Firm* — Maginot Moore & Beck LLP

(57) ABSTRACT

A method of interpreting input from a user includes providing a surface within reach of a hand of the user. A plurality of locations on the surface that are touched by the user are sensed. An alphanumeric character having a shape most similar to the plurality of touched locations on the surface is determined. The determining includes collecting information associated with hand region localized modules, and modeling the information using statistical models. The user is informed of the alphanumeric character and/or a word in which the alphanumeric character is included. Feedback is received from the user regarding whether the alphanumeric character and/or word is an alphanumeric character and/or word that the user intended to be determined in the determining step.

10 Claims, 5 Drawing Sheets

(56) References Cited

U.S. PATENT DOCUMENTS

| | | | |
|---|---|---|---|
| 2006/0047386 A1* | 3/2006 | Kanevsky | B60K 35/00 701/36 |
| 2006/0085115 A1* | 4/2006 | Ilan | B60R 16/0373 701/49 |
| 2010/0073318 A1* | 3/2010 | Hu et al. | 345/174 |
| 2010/0322300 A1 | 12/2010 | Li et al. | |
| 2011/0050589 A1* | 3/2011 | Yan et al. | 345/173 |
| 2012/0105613 A1* | 5/2012 | Weng et al. | 348/77 |

FOREIGN PATENT DOCUMENTS

| WO | WO2012/139241 A1 * | 10/2012 | |
|---|---|---|---|
| WO | WO 2012139241 A1 * | 10/2012 | G06F 3/017 |

* cited by examiner

METHOD OF FUSING MULTIPLE INFORMATION SOURCES IN IMAGE-BASED GESTURE RECOGNITION SYSTEM

BACKGROUND OF THE INVENTION

1. Field of the Invention

The invention relates to a system and method for gesture recognition, and, more particularly, to systems and methods for electronically receiving and processing inputs, commands and information from a human.

2. Description of the Related Art

Information entry in a motor vehicle by the vehicle operator, such as address entry to navigation devices, has always been a challenging and often dangerous task. Traditionally, vehicle operators issue commands or enter information by operating various controls in the car, such as physical buttons for radios, or displayed buttons on the touch screen of a navigation system. Such operations typically require that the operator divert his eyes from the road in order to locate the desired buttons, and sometimes the operator overstretches his arms in trying to reach the desired buttons. This is especially distracting, time-consuming, and dangerous when the buttons are small, such as on a touch screen, and the task is complicated, such as when entering an address into a navigation device. Moreover, a touch screen has to be installed within close proximity to (i.e., within the reach of) the driver, thus limiting the design options for in-vehicle dashboard layout.

Instead of using touch screens, several auto manufacturers use a combination of remote control and graphical display (for example, BMW iDrive system, and Lexus Remote Touch Interface system), so that the graphical display could be placed farther away from the operator. Still, these systems require that the operator operates the remote controls, and looks at the visual feedback on the graphical display for information and command entry. Address entry on the iDrive system, for example, requires that the operator operates the remote control to select from a list of letters, states, and/or city names from the graphical display. This is still a lengthy and dangerous process as the operator needs to move his eyes off the road for a significant period of time.

An alternative method of input is gesture recognition using hand movements. However, due to illumination changes, reflections, shadows, and occlusions, it is often challenging to detect the human body parts, or gestures, in a robust manner under adverse operational conditions.

What is neither disclosed nor suggested in the art is a driver input system that overcomes the problems and limitations described above. More particularly, what is neither disclosed nor suggested is a driver input system that enables the user to provide inputs via spatial hand gestures such as by "drawing" alphanumeric characters with his finger on a surface within the vehicle, and that is able to interpret the drawn alphanumeric characters with a high level of accuracy.

SUMMARY OF THE INVENTION

The invention may provide a method and framework to fuse multiple information sources in a gesture recognition system, which can improve the reliability and robustness of the gesture recognition system. The invention may also provide a method to effectively use the available visual information captured by the gesture capture module in a more robust manner instead of using heuristics.

In a practical scenario, the gesture capture module of the invention may have improved robustness over wide range of operational conditions. Known heuristic methods have some limitations due to some fixed paradigms. According to the invention, better results may be obtained by fusing the information from the capture module in a more environmental robust and easily adaptive manner.

Fusing the information from the capture module is a useful concept due to the combining of discriminative powers in order to gain more discriminative power, thereby making the decision regarding hand localization more robust. However, when the environment is changed too much such that the environment is outside of the operational range of the original environment, then improvements in addition to fusing the information from the capture module may be beneficial.

According to the invention, the information from all modalities may be effectively included in a higher level decision module, while each information source can be described by several adjustable parameters. This framework may provide a way to adaptively adjust those parameters so that the valid operational range of the system as well as the reliability of the system is enhanced.

The invention may be feasible in conjunction with a gesture recognition system, as well as with other similar systems in which information may be fused under a wide range of operational environments.

The invention may provide high-level binary-class features to enhance model-based skin-color detection. The log likelihood ratio of the testing data between skin and non-skin RGB models can be a good discriminative feature. The background-foreground correlation provides another complementary feature in addition to the low-level RGB feature. Further improvement can be accomplished by Bayesian model adaptation and feature fusion. By jointly considering both schemes of Bayesian model adaptation and feature fusion, the improved system performance may be achieved.

The invention may provide a method of skin color detection to localize hands in videos from a model-based perspective. The invention may utilize high-level features available in the binary-class situations for skin color detection. One such feature is the log likelihood ratio between the densities of skin and non-skin models. Another discriminative feature is the correlation between skin foreground and non-skin foreground.

Utilizing model-based methods may enable feeding back the evidences from the observed data into previously trained models so that the adjusted parameters of the trained models can not only better fit the observed data but also still maintain good generalization capability. One method is Bayesian model adaptation, such as maximum a posteriori (MAP) adaptation.

Multi-modal information may also be beneficial to the detection performance. Scores generated by several modalities may serve as feature to train a feature fusion model. The regularized log likelihood ratio (LLR) feature and the foreground-background correlation coefficient may be fused into a single feature vector.

Skin and non-skin models can be trained on the above-mentioned feature vector to obtain an improved performance over the low-level RGB feature vector. The detection performance may be further enhanced if the LLR features are replaced with MAP-adapted LLR features.

In one form thereof, the invention comprises a method of interpreting input from a user, including providing a surface within reach of a hand of the user. A plurality of locations on the surface that are touched by the user are sensed. An alphanumeric character having a shape most similar to the plurality of touched locations on the surface is determined. The determining includes collecting information associated with hand region localized modules, and modeling the information using statistical models. The user is informed of the alphanumeric character and/or a word in which the alphanumeric character is included. Feedback is received from the user regarding whether the alphanumeric character and/or word is an alphanumeric character and/or word that the user intended to be determined in the determining step.

In another form thereof, the invention comprises a gesture-based input and interpretation system including a surface within reach of a hand of the user. A gesture-capturing device is associated with the surface and senses a plurality of locations on the surface that are touched by the user. A gesture recognition device is communicatively coupled to the gesture-capturing device. The gesture recognition device collects information associated with hand region localized modules, and models the information using statistical models. Scores generated by a plurality of different modalities and/or modules are combined. The combined scores are used to build a higher level statistical model. An alphanumeric character represented by the plurality of touched locations on the surface is determined based at least in part on the higher level statistical model.

In yet another form thereof, the invention comprises a method of interpreting input from a user, including sensing a plurality of locations on a surface that are touched by the user. Information associated with hand region localized modules is collected. The information is modeled using statistical models. Scores generated by a plurality of different modalities and/or modules are combined. The combined scores are used to build a higher level statistical model. An alphanumeric character represented by the plurality of touched locations on the surface is determined based at least in part on the higher level statistical model.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
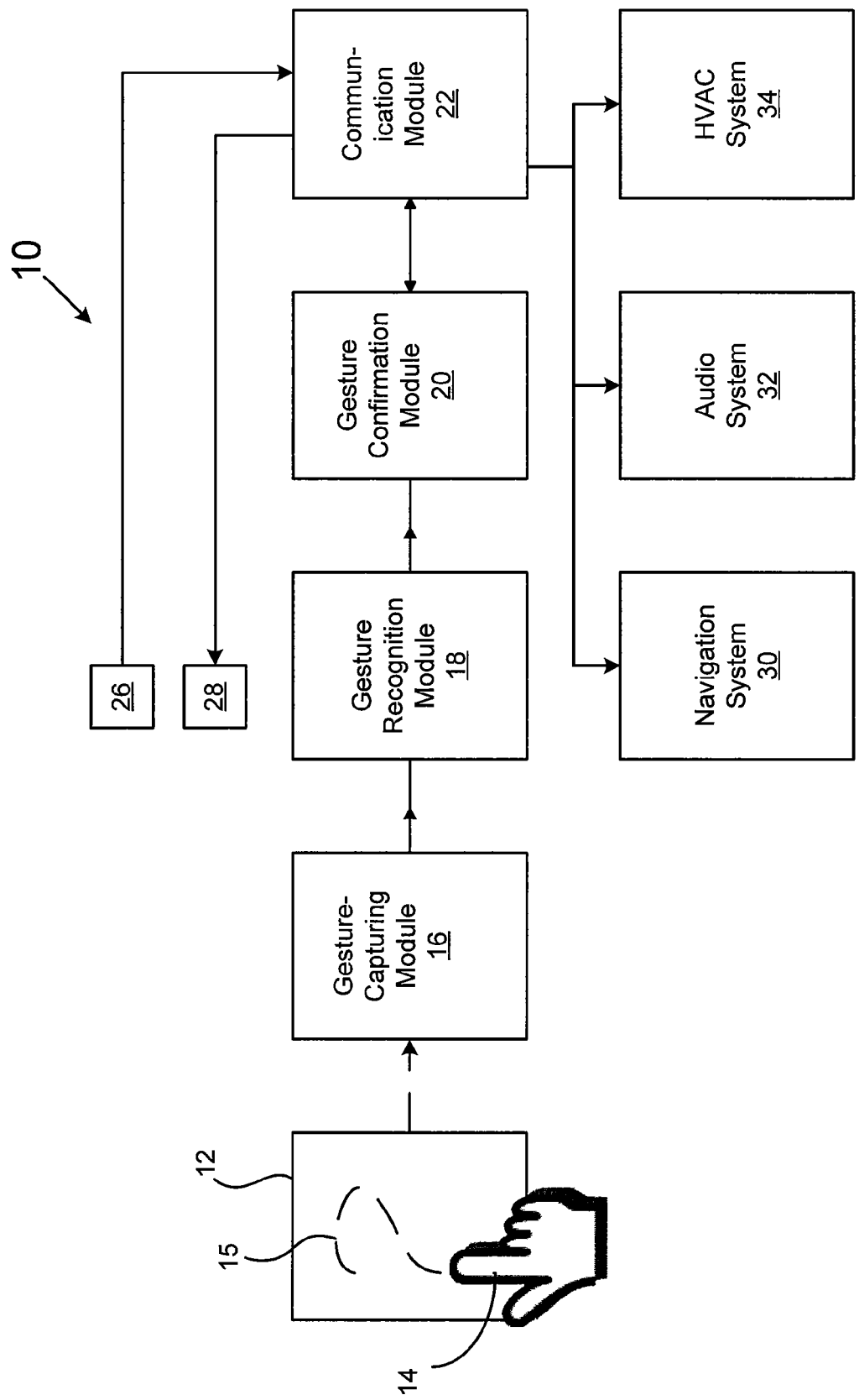
FIG. 1 is a block diagram of one embodiment of a gesture-based information and command entry system of the invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE INVENTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

The invention may be used in conjunction with a system that enables a motor vehicle operator to enter information and commands without diverting his eyes from the road or over-stretching his arms. Using the system, the operator "writes", via hand gestures, on a surface anywhere within a pre-designated area close to the operator in the motor vehicle, such as the surface of the steering wheel or arm rest. Any surface within the operator's proximity may be used to write upon. Gestures may be in the form of the operator sliding his finger across the surface to make writing movements. Thus, the invention may avoid the need for the operator to locate and operate pushbuttons. The information and commands denoted by the hand gestures may be captured by a gesture capturing module, recognized by a recognition module, confirmed via a confirmation module, and then transmitted to corresponding devices within the vehicle.

In one embodiment of the system, one or more cameras are mounted inside a motor vehicle to capture the image of the steering wheel, as well as the operator's hand gestures when he "writes" on the steering wheel. In a particular embodiment, the operator writes down the destination address for the navigation device on the steering wheel using his index finger, just as he would on a piece of paper. The hand gestures, i.e., the movements of the user's hand and fingers, may be captured by the mounted camera(s). A recognition module may recognize the address denoted by the hand gestures. The recognized address may then be transmitted to the navigation device.

Other embodiments of the invention may integrate the gesture input modality with other user input modalities such as speech input in a dialog system. In one embodiment, the user may speak the destination address while writing all or part of the address on the steering wheel using hand gestures. Both speech input and hand gesture input may be integrated to help the recognition module recognize the intended address.

The in-vehicle information and command entry system may use a surface anywhere within the operator's proximity, and integration with a dialog system with acoustic confirmation. The invention provides a novel paradigm shift and yet also provides a natural input approach: the operator writes down information instead of using a set of predefined gesture patterns.

The invention may be applicable to any in-vehicle human-machine interface (HMI) system. For example, the operator input system of the invention may be used to enter inputs into a navigation system, an entertainment system, or an HVAC (heating, ventilation, and air conditioning) climate control system.

Referring now to the drawings, and particularly to FIG. 1, there is shown one embodiment of a gesture-based input and interpretation system 10 which may be used in conjunction with a method of the invention, including a surface 12 on which a user may "air-write" by sliding his index finger 14 across surface 12. Finger 14 may maintain contact with surface 12 throughout the writing process.

The user may write alphanumeric characters on surface 12. In the example of FIG. 1, the user is writing the number "2" on surface 12. For illustrative purposes, the beginning of the number "2" is depicted in a dashed line 15 on surface 12.

However, in actuality, there may be no visible indication on surface 12 of where finger 14 has previously been.

The movements of finger 14 along surface 12 may be sensed and recorded by gesture-capturing module 16. In one embodiment, gesture-capturing module 16 may be in the form of one or more cameras. For example, module 16 may detect and record in digital form the movement of finger 14 along a path, such as the path depicted by line 15.

The finger movements sensed by module 16 may be digitized, and these digitized movements may be transmitted as an input to a gesture recognition module 18. Gesture recognition module 18 may determine which of the twenty-six letters or ten numerals is best represented by the movement made by the user's finger or hand. Module 18 may recognize lower- or upper-case letters, and also may recognize printed letters, block letters, or script letters.

The recognition function performed by module 18 may depend upon the shape of surface 12. For example, if surface 12 is convex, as may be typical for the central portion of a steering wheel, then module 18 may take the convexity into account when determining which alphanumeric character has been drawn. Further, module 18 may take into account the exact shape of surface 12, including the position of each point of surface 12 along a direction generally perpendicular to surface 12.

Gesture recognition module 18 may recognize a single character, or may recognize groups of letters and/or numbers in the form of words. Module 18 may discern a recognizable word when enough characters have been drawn to do so, or after the user has indicated that the last character of a word has been drawn. The user may indicate that the last character of a word has been drawn by, for example, drawing a period (i.e., dot) on surface 12 or by interrupting his drawing activity on surface 12 for a predetermined period of time.

The output of gesture recognition module 18 may be in the form of a word, letter or number that corresponds to a possible selection, command, input, or piece of information provided by the user. For example, the output of gesture recognition module 18 may be in the form of the letter "B", or the numeral "3" corresponding to particular respective menu selections. The output of gesture recognition module 18 may also be in the form of a command such as "find" for a navigation system, "play" for an entertainment system, or "defrost" for an HVAC system, for example. Associated with such commands may be input data that the user also writes on surface 12, before or after the command. For example, associated with the command "find" may be the address "10 μm Street". As another example, associated with the command "play" may be "Beethoven 5$^{th}$ Symphony", or a radio station identification such as "WGN" or "720 AM". As yet another example, associated with a "heat" command for an HVAC system may be a temperature level such as "75 F" and/or a location such as "driver".

Figure 2:
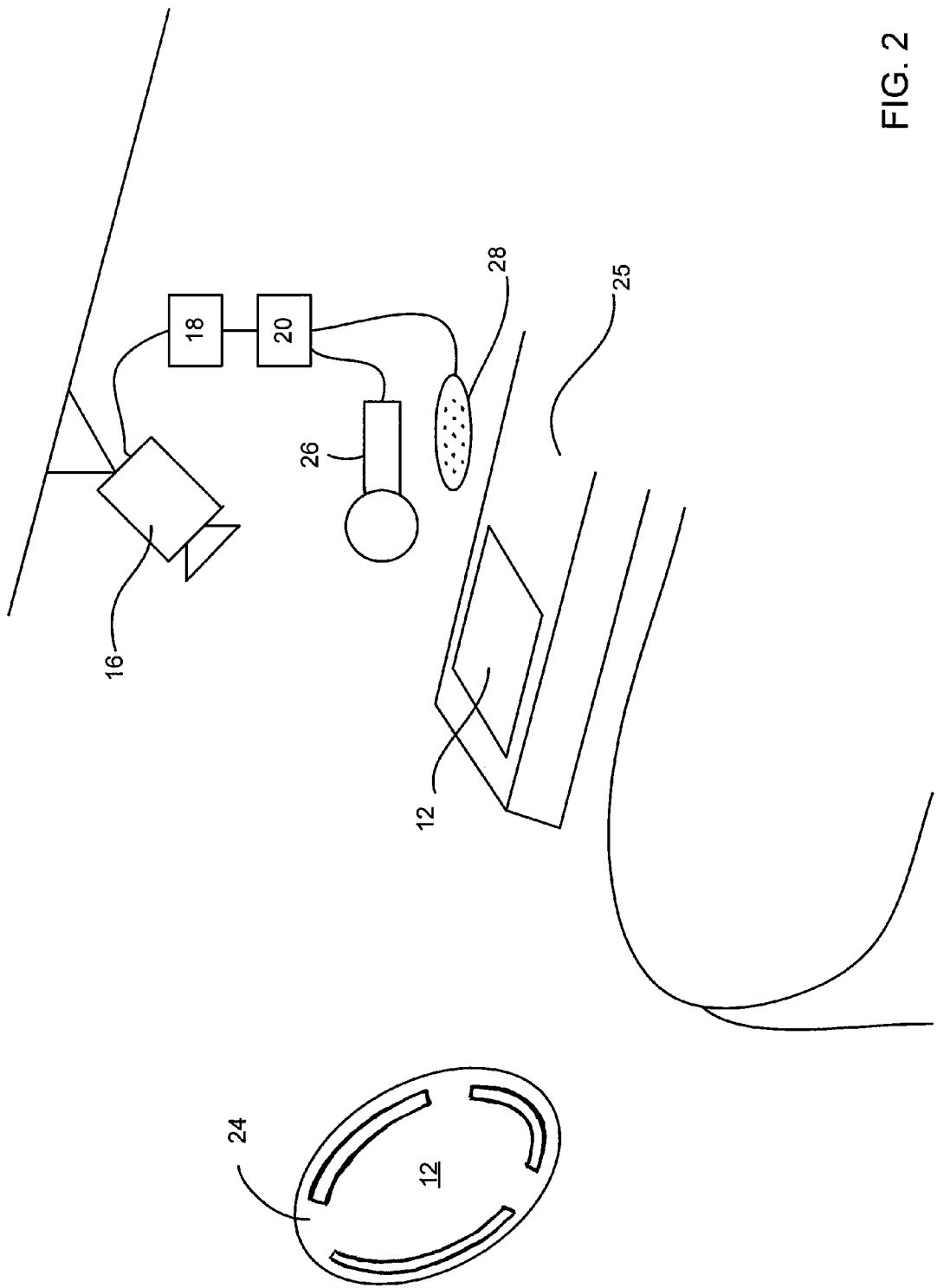
FIG. 2 is a perspective view of the gesture-based information and command entry system of FIG. 1.

The output of gesture recognition module 18 may be received by an optional gesture confirmation module 20. Gesture confirmation module 20 may seek and/or receive feedback from the user to confirm that the output of gesture recognition module 18 is correct. For example, confirmation module 20 may audibly seek confirmation from the user of his input. If the output of gesture recognition module 18 is "defrost", then confirmation module 20 may audibly (e.g., via audio speaker 28; FIG. 2) ask the driver "Did you write 'defrost?'". In order to confirm that he did indeed say "defrost", the user may speak "yes", which may be received by a microphone 26 and input into confirmation module 20. Alternatively, the user may confirm that he did indeed say "defrost" by writing "y" for "yes" on surface 12. If, on the other hand, the user did not write "defrost", then he may speak "no" or write "n" on surface 12. In response, confirmation module 20 may audibly ask the driver to "please re-write the previous entry". The cycle continues with gesturing capturing module 16 interpreting the user's gestures until confirmation module 20 receives confirmation that it recognized the gesture correctly (i.e., as the user intended). After receiving confirmation of correct recognition of the user's gesture, confirmation module 20 may then forward the recognized gesture to a vehicle system, such as navigation system 30, audio system 32 or HVAC system 34. In addition, or in the alternative, confirmation module 20 may use other modalities (visual, pushbutton, gesture, etc.) for seeking user confirmation as well.

It is to be understood that gesture confirmation module 20 is optional in the invention. That is, it is possible for the recognition output of module 18 to be forwarded to vehicle systems 30, 32 and/or 34, perhaps by communication module 22, without the recognition or interpretation being first confirmed by confirmation module 20.

A perspective view of gesture-based input and interpretation system 10 as installed within the passenger compartment of an automobile is shown in FIG. 2. Two surfaces 12 for the driver to finger-write upon are shown, although only one of the two surfaces 12 may be included in practice. One of surfaces 12 is provided in the central portion of a steering wheel 24. Another one of surfaces 12 is provided on the top of the driver's right-hand side armrest 25.

A gesture-capturing module in the form of a camera 16 may be installed on the roof of the car's passenger compartment, generally above the driver's head. Camera 16 may be directed towards whichever of the two surfaces 12 is actually provided in the vehicle. However, it is also possible, in an embodiment which includes both of surfaces 12, for camera 16 to be adjustable such that it may be selectively directed at either or both of surfaces 12.

As shown in FIG. 2, confirmation module 20 may be connected to a microphone 26 and an audio speaker 28. Microphone 26 and audio speaker 28 may be installed anywhere within the passenger compartment, such as in the armrest, in the dashboard, or in the doors, for example.

Figure 3:
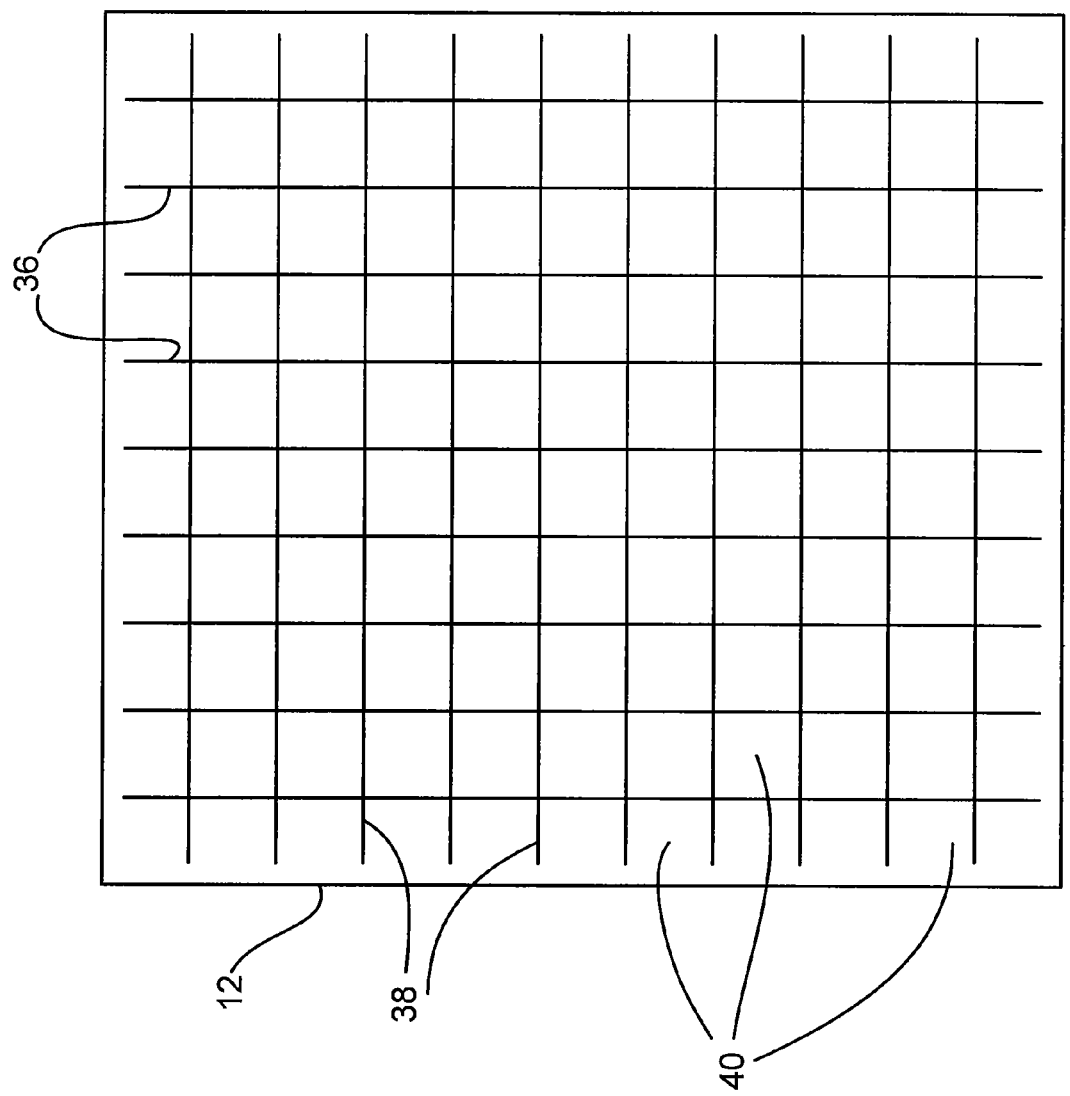
FIG. 3 is a plan view of one embodiment of the writing surface of FIGS. 1 and 2.

FIG. 3 illustrates a grid layout that may be included in one embodiment of a writing surface 12. The grid layout includes a rectangular matrix of rows and columns as defined by equally-spaced vertical lines 36 and equally-spaced horizontal lines 38.

Gesture recognition module 18 may determine which alphanumeric character the user has drawn based upon which cells 40 within the grid layout the user has slid his finger across, and in what sequential order he did so. Gesture recognition module 18 may use a lookup table or an algorithm to make a list of cells 40 that the user's finger has passed across, and translate that list of cells into a recognized alphanumeric character. The sequential order in which cells 40 were touched may also be an input into the lookup table or algorithm.

In order to improve the visual contrast between the user's hand and background surface 12, and thus improve the accuracy of the gesture-capturing process, surface 12 may be formed of a solid color such as white. Such a solid white color for surface 12 may also make it easier for camera 16 to detect the locations of lines 36, 38 by virtue of the greater contrast provided thereby.

In order to understand or interpret a gesture, a gesture understanding module of the invention may interpret the recorded video sequence and interpret the meaning of the extracted trajectory. In order to determine the trajectory, the meaningful hand regions may be effectively localized. In order to effectively localize the meaningful hand regions, the useful visual information may be combined or fusioned in a more systematic way. The information coming from several different modalities may be combined under a model based manner.

According to one embodiment of the invention, information related to subjects may be collected and modeled using statistical models such as Gaussian Mixture Models, Support Vector Machines, or other suitable models. Such subjects may include hand region localized modules, as described in U.S. patent application Ser. No. 12/550,128. The scores generated by different modalities and modules may then be combined and used to build higher level statistical models. During online operation, it may be determined whether the scores gained from each model at lower levels pass the reliability test (e.g., to determine whether the resulting score is convincing). The reliable scores which pass the reliability test may be fed back into the lower level systems so that the lower level scores may become more evident. The lower level scores may be fed into higher level models to generate higher level scores and to make a final decision. The number of levels may be extended in a pyramid structure. The different modules may be distributedly run on multiple processors in parallel.

In one embodiment, average RGB value within a block of size 16×16 is chosen as a feature vector. This low-level RGB feature vector may be used to design baseline detectors by modeling skin and non-skin classes as Gaussian mixture models (GMMs). High-level features may include log likelihood ratio (LLR) score and background-foreground correlation, available in the current binary-class setting. The LLR feature may be enhanced through Bayesian adaptation and fusion of these two features.

When images are given by video clips instead of with individual pictures, some information may be obtained by comparing the background (non-skin) and foreground (skin) regions. An energy-based algorithm may be used to identify background frames.

The first frame of each clip may be assumed to always be a background frame. Then all other frames in the same clip may be examined using a given threshold η, 0<η<1. For the $i^{th}$ frame, if its sample standard deviation σ; satisfies the following inequality, it is considered as a background, $$(\sigma_i - \sigma_{min})/(\sigma_{max} - \sigma_{min}) < \eta$$

Contiguous background frames may then be averaged to form an averaged background for future comparison.

Having identified background frames, blocks in each non-background frame may be compared with their corresponding background blocks to check if they are in the same class. To test if two blocks in similar images belong to the same class, their sum of squared errors may be examined.

When training and testing conditions are different, parameters obtained from the training phase may not be able to describe the actual distribution of the testing data. Bayesian model adaptation, such as maximum a posteriori (MAP) adaptation, may assume the form of the prior density to be a conjugate prior of the probability density function of the feature vectors, and therefore the posterior density may not only include the observed data information, but also may have the same form as the prior density. The information of the observed data and the prior density may be effectively combined under this framework.

Score fusion may be useful to integrate information from several modalities or features. One way is to find a simple transform to combine the outputs of several classifiers online. Another way is to treat scores generated by competing classifiers as features to train higher level classifiers, as implemented by the invention.

The log likelihood ratio of skin vs. non-skin color models and the linear correlation coefficient may be chosen as the elements to be combined. These two discriminative features can be combined to train fusion classifiers modeled by GMMs for skin and non-skin classes, respectively. To ensure the model does not favor a specific feature, the log likelihood ratio (LLR) may be regularized.

A joint framework may use the MAP adaptation to replace the LLR score with MAP-adapted LLR score under the fusion scheme. This joint framework can simultaneously enhance discriminative power and compensate the mismatch between training and testing conditions.

The invention may employ two high level features available in binary detection and classification problems, namely likelihood ratio of competing skin and non-skin models and correlation between foreground and background, for skin color detection. The robustness of these features may be enhanced by embedding MAP adaptation into the original feature fusion scheme.

Figure 4:
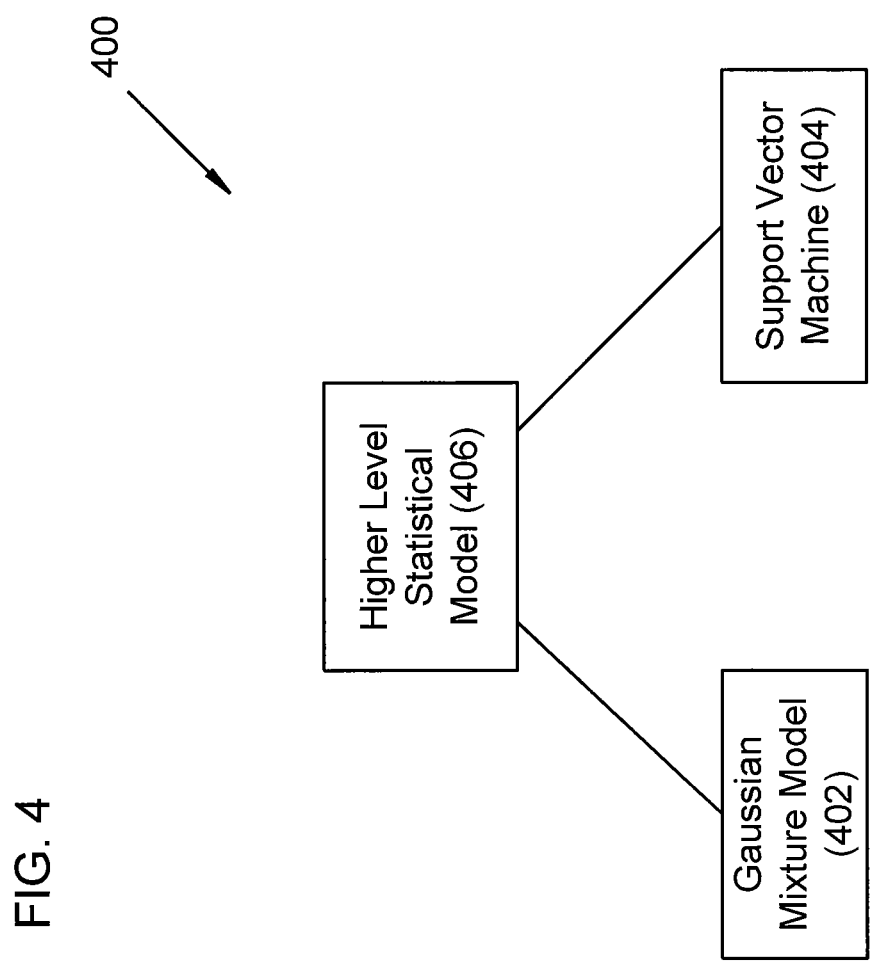
FIG. 4 is a block diagram of one embodiment of a pyramid structure according to the invention.

In FIG. 4, there is shown one embodiment of a very simple pyramid structure 400 according to the invention. Information is modeled using statistical models including a Gaussian Mixture Model 402 and a Support Vector Machine 404. Scores generated by Gaussian Mixture Model 402 and a Support Vector Machine 404 may be combined. The combined scores may be used to build a higher level statistical model 406. As illustrated by FIG. 4, two levels are extended in a pyramid structure.

Figure 5:
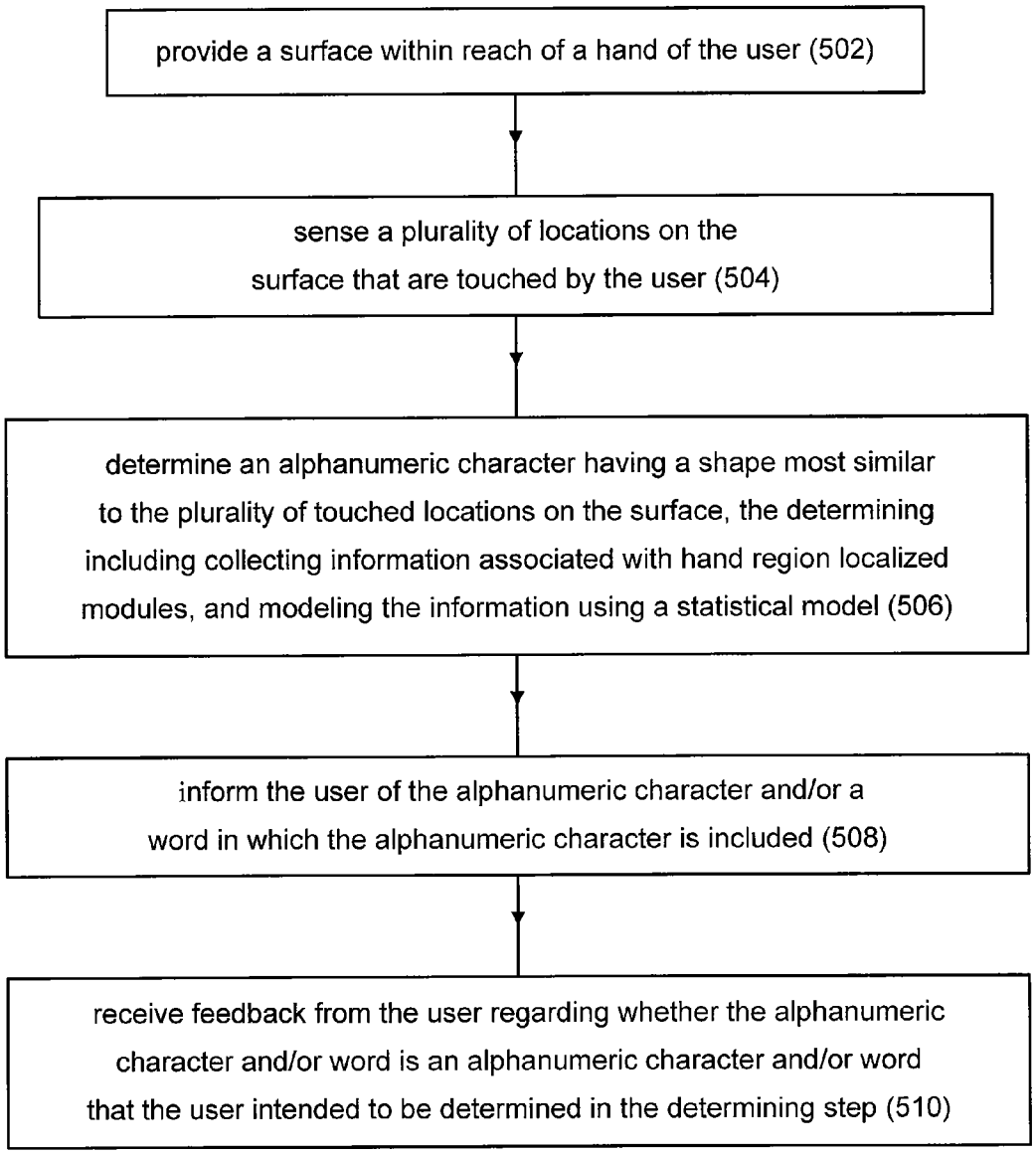
FIG. 5 is a flow chart of one embodiment of a method of the invention for processing input from a user.

In FIG. 5, there is shown one embodiment of a method 500 of the invention for interpreting input from a user. In a first step 502, a surface (e.g., surface 12) is provided within reach of a hand of the user. In a next step 504, a plurality of locations on the surface that are touched by the user are sensed. For example, as shown in FIG. 1, locations along dashed line 15 touched by the user are sensed. Next, in step 506, an alphanumeric character having a shape most similar to the plurality of touched locations on the surface is determined by collecting information associated with hand region localized modules, and modeling the information using a statistical model. For example, a Gaussian Mixture Model 402 and a Support Vector Machine 404 may be used to determine an alphanumeric character having a shape most similar to dashed line 15. In step 508, the user is informed of the alphanumeric character and/or a word in which the alphanumeric character is included. In a final step 510, feedback is received from the user regarding whether the alphanumeric character and/or word is an alphanumeric character and/or word that the user intended to be determined in the determining step.

According to the invention, the system reliability and robustness may be enhanced. The embedding adaptive methods may enlarge the operational range of the original system.

While this invention has been described as having an exemplary design, the invention may be further modified within the spirit and scope of this disclosure. This application is therefore intended to cover any variations, uses, or adaptations of the invention using its general principles.

What is claimed is:
1. A method of interpreting input from a user, said method comprising:
providing a surface within reach of a hand of the user;
sensing a plurality of locations on the surface that are touched by the user;

determining an alphanumeric character having a shape most similar to the plurality of touched locations on the surface, the determining including:

collecting information associated with a plurality of hand localized modules corresponding to skin on the hand of the user and a background corresponding to the surface;

generating a first score corresponding to a likelihood that a portion of the collected information corresponds to the skin on the hand of the user using a first lower level statistical model;

generating a second score corresponding to a likelihood that a portion of the collected information corresponds to the background using a second lower level statistical model;

generating a combined score based on the first score and the second score using a higher level statistical model;

identifying the alphanumeric character using combined scores from the first and second lower level statistical models and the higher level statistical model; and generating an output for the user including the alphanumeric character; and receiving feedback from the user regarding whether the alphanumeric character included in the output corresponds to the plurality of touched locations on the surface.

2. The method of claim 1 wherein the first and second lower level statistical models further include a Gaussian Mixture Model and a Support Vector Machine.

3. The method of claim 1 further comprising:

during online operation, determining whether the first and second scores from the first and second lower level models passes a reliability test.

4. The method of claim 3 comprising the further step of feeding back the scores that passed the reliability test into the first and second lower level models such that the first and second scores are more evident.

5. The method of claim 1 comprising the further step of distributedly running the plurality of hand localized modules on a plurality of processors in parallel.

6. The method of claim 1 wherein the first and second low level models generate the first and second scores, respectively, corresponding to a likelihood ratio of the information from the plurality of hand localized modules corresponding to skin or non-skin information.

7. A gesture-based input and interpretation system, comprising:

a surface within reach of a hand of the user;

a gesture-capturing device associated with the surface and configured to sense a plurality of locations on the surface that are touched by the user; and a gesture recognition device communicatively coupled to the gesture-capturing device and configured to:

collect information associated with a plurality of hand region localized modules corresponding to skin on the hand of the user and a background corresponding to the surface;

generate a first score corresponding to a likelihood that a portion of the collected information corresponds to the skin on the hand of the user using a first lower level statistical model;

generate a second score corresponding to a likelihood that a portion of the collected information corresponds to the background using a second lower level statistical model;

generate a combined score based on the first score and the second score using a higher level statistical model; and determine the alphanumeric character using combined scores from the first and second lower level statistical models and the higher level statistical model.

8. The system of claim 7 wherein the first and second lower level statistical models include a Gaussian Mixture Model a Support Vector Machine.

9. The system of claim 7 wherein the gesture recognition module includes a plurality of processors, the gesture recognition module being configured to distributedly run the plurality of hand localized modules on the processors in parallel.

10. The system of claim 7 wherein the first and second low level models generate the first and second scores, respectively, corresponding to a likelihood ratio of the information from the plurality of hand localized modules corresponding to skin or non-skin information.

\* \* \* \* \*